United States Patent
Pilavdzic et al.

(10) Patent No.: US 7,800,021 B2
(45) Date of Patent: Sep. 21, 2010

(54) SPRAY DEPOSITED HEATER ELEMENT

(75) Inventors: Jim Pilavdzic, Nobleton (CA); Stefan Von Buren, Colchester, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 652 days.

(21) Appl. No.: 11/772,156

(22) Filed: Jun. 30, 2007

(65) Prior Publication Data

US 2009/0001066 A1    Jan. 1, 2009

(51) Int. Cl.
*F27D 11/00* (2006.01)
*H01C 1/12* (2006.01)

(52) U.S. Cl. .................. 219/385; 219/542; 219/543; 219/212; 219/538; 219/552; 219/553; 219/483; 219/241; 219/535; 219/494; 219/426; 219/539; 219/541; 219/544; 219/548; 338/307

(58) Field of Classification Search .......... 219/385, 219/542–543, 212, 538, 552–553, 483, 241, 219/535, 494, 422, 426, 539, 541, 544, 548; 338/307; 425/478

See application file for complete search history.

(56) References Cited

U.S. PATENT DOCUMENTS

| | | |
|---|---|---|
| 4,200,459 A | 4/1980 | Smith, Jr. et al. |
| 4,678,635 A | 7/1987 | Jahnke |
| 5,006,163 A | 4/1991 | Benn et al. |
| 5,283,032 A | 2/1994 | Wanner et al. |
| 5,439,640 A | 8/1995 | Heck et al. |
| 5,478,417 A | 12/1995 | Heck et al. |
| 5,863,668 A | 1/1999 | Brindley et al. |
| 6,093,454 A | 7/2000 | Brindley et al. |
| 6,341,954 B1 | 1/2002 | Godwin et al. |
| 6,761,557 B2 * | 7/2004 | Gellert et al. ............... 425/549 |
| 6,764,297 B2 | 7/2004 | Godwin et al. |
| 6,974,637 B2 | 12/2005 | Pfaendtner et al. |
| 7,041,944 B2 | 5/2006 | Pilavdzic et al. |
| 7,071,449 B2 | 7/2006 | Godwin et al. |
| 2004/0099657 A1 | 5/2004 | Park |
| 2004/0149733 A1 | 8/2004 | Abbott et al. |
| 2005/0145616 A1 | 7/2005 | Ptasienski et al. |
| 2005/0257367 A1 * | 11/2005 | Cirri et al. ................ 29/623.5 |
| 2006/0054616 A1 | 3/2006 | Ptasienski et al. |
| 2007/0138166 A1 | 6/2007 | Fennewald et al. |

FOREIGN PATENT DOCUMENTS

WO    2004113044 A2    12/2004

* cited by examiner

*Primary Examiner*—Shawntina Fuqua (57) ABSTRACT

A heater that may be applied to a substrate. The heater may include a graduating material deposited on at least a portion of a substrate, a resistive material and a thermal barrier dielectric coating. The resistive material may include at least two resistive compositions, wherein the resistivity of the material may be altered by varying the composition in given areas.

10 Claims, 7 Drawing Sheets

SPRAY DEPOSITED HEATER ELEMENT

TECHNICAL FIELD OF THE INVENTION

The present disclosure relates to a spray deposited heating element and a method of applying said heater element.

DESCRIPTION OF THE RELATED ART

In various molding processes, a polymeric material may be supplied wherein it is desirable to heat and maintain the polymeric material at a viscosity sufficient to allow for the polymeric material to flow in the molding apparatus. In other molding process, a polymeric material may be supplied wherein it is desirable to heat the polymeric material once the material has reached the mold, such that the material cures or crosslinks. Accordingly, different aspects of the molding apparatus may utilize heating elements. For example, in an injection molding machine, it may be necessary to heat a barrel, nozzle, a sprue bushing, a hot runner manifold, including hot runner nozzles, and portions of a mold.

Heater elements may include items such as cartridge, heater bands, coiled cable heaters, silicon rubber heater, etc. However, many of these heating elements rely upon intimate contact with the surface to be heated to conduct heat and in some cases it may even be necessary to apply a heat transfer compound between the heating element and the surface to be heated. In addition, the heater elements may be bulky with respect to the clearances within which the elements must fit and additional design space to accommodate the elements may need to be provided. Furthermore, some types of heater elements may be unable to fit into areas where heating is desired. Other elements may also be prone to molten polymer material seeping between the heating element and the surface to be heated. Such problems may reduce the efficiency of these heaters. Further, polymer dust generated from molding process can cover wire wound heaters and cause it to overheat due to surface contamination.

Other heating elements have been developed and applied to various aspects of the molding process equipment with the aim to reduce necessary clearance or design space for the heater elements or to increase heating efficiency. For example, U.S. Patent Application No. 2005/0257367 describes in the abstract "[a] method for producing components for injection molding comprising a body made of thermally conducting material with expansion coefficient matching that of the insulating layers and provided with a passage for the material to be injected." The abstract continues to disclose applying at least one strip of electrically conducting material with high change of resistance with temperature onto an electrically insulating base layer, which was previously applied to the body.

SUMMARY OF THE INVENTION

An aspect of this disclosure relates to a heater that may include a graduating material layer, a resistive material disposed over at least a portion of the graduating material comprising a mixture of a first resistive material having a first specific resistivity of $\rho_1$ and that second resistive material having a second resistivity of $\rho_2$, wherein $\rho_1 \neq \rho_2$, and a thermal barrier dielectric material disposed over at least a portion of the resistive material.

Another aspect of this disclosure relates to a system for heating including a heater, at least one contact terminal and a controller. The heater may include a graduating material, a resistive material deposited in a layer over at least a portion of the graduating material, wherein the resistive material includes at least two resistive compositions and the first resistive composition has a first resistivity $\rho_1$ and the second resistive composition has a second resistivity $\rho_2$. The resistivity of said resistive material may change across at least a portion of said resistive layer depending on the weight percentage of the first and second resistive compositions present in that portion.

A further aspect of this disclosure relates to a method of forming a heater. The method includes depositing a graduating material on at least a portion of a substrate, depositing a resistive material over at least a portion of the substrate including a first resistive composition and a second resistive composition, wherein the first resistive composition has a first resistivity of $\rho_1$ and the second resistive composition has a resistivity of $\rho_2$, wherein $\rho_1 \neq \rho_2$; and depositing a thermal barrier dielectric material over at least a portion of the substrate.

BRIEF DESCRIPTION OF THE DRAWINGS

The detailed description below may be better understood with reference to the accompanying figures which are provided for illustrative purposes and are not to be considered as limiting any aspect of the present disclosure.

DETAILED DESCRIPTION

The present disclosure relates to providing a spray deposited heater in a molding apparatus. A polymeric material may be supplied wherein it is desirable to heat and maintain the polymeric material at a viscosity sufficient to allow for the polymeric material to flow in the molding apparatus. In other molding processes, a polymeric material may be supplied wherein it is desirable to heat the polymeric material once the material has reached the mold, such that the material cures or crosslinks. Accordingly, due to the various process requirements, different components of a molding apparatus may require heating elements. For example, an injection molding machine may utilize an injection unit nozzle, mold, a heated sprue bushing or a hot runner manifold and nozzles. However, the spaces around these components may be limited and the components may be subject to some degree of movement during an injection molding cycle. Furthermore, some of these components may have a complex geometry and/or include a number of heat sinks.

An aspect of the present disclosure relates to providing a spray deposited heater that may conform to a given component geometry, vary in resistivity and include a profile that may be less than approximately a few millimeters in thickness. The spray deposited heater may include a resistive layer composed of at least two compositions having dissimilar resitivities, i.e., the compositions may vary in resistivity by at least 0.1% or greater. The compositions may be applied in such a manner to vary the resistance of at least one portion of the layer. This may be accomplished by altering the weight percentage of the resistive materials in the given portion.

The heater may also include a dielectric material and a graduating material, which may be used to accommodate for the difference in the thermal expansion between a given substrate and the resistive dielectric layers. Furthermore, the heater may include sealant materials, conductive materials and/or materials having a relatively high permeability. Permeability is the degree of magnetization of a material that responds linearly to an applied magnetic field—to effectively absorbed magnetic field and use it to convert into a heat. The heater may be formed on the surface of a given substrate, such as a machine nozzle, mold, sprue busing, hot runner manifold, hut runner nozzles, etc.

Figure 1:
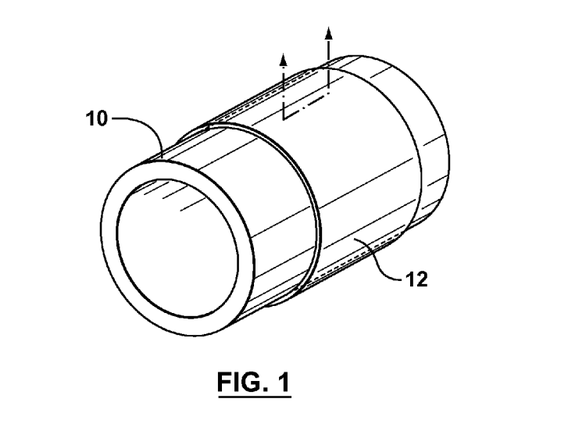
FIG. 1 is a perspective view of an exemplary nozzle body including a spray deposited heater element.
Figure 2:
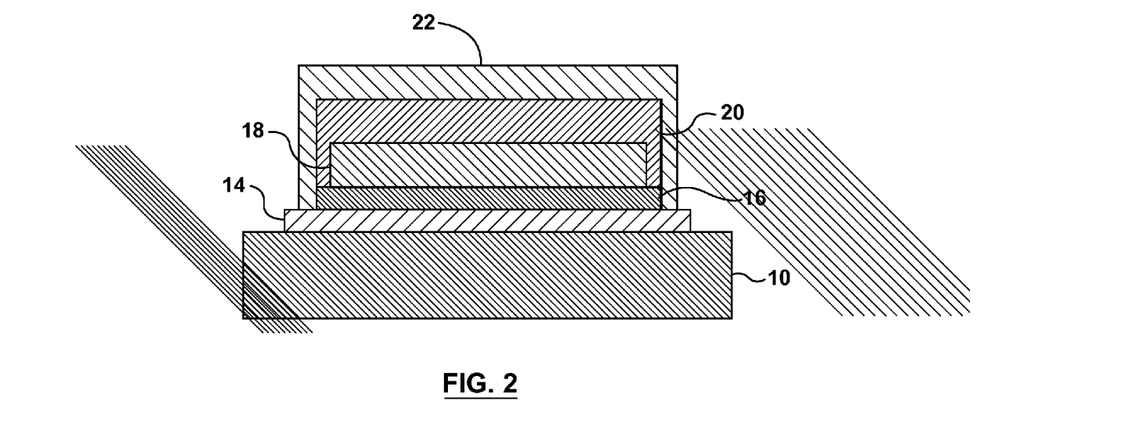
FIG. 2 is an exemplary cross-section of a spray deposited heater element.

An exemplary embodiment of a heating element is illustrated in FIGS. 1 and 2. FIG. 1 illustrates a perspective view of a substrate, in the form of a nozzle body, 10, which may be used in conjunction with either a extruder or a hot runner. Accordingly, while this embodiment is described in reference to a nozzle body 10, the heater 12 may be applied to any substrate forming a part of a molding machine. The heater 12 may be disposed over the surface of the nozzle body 10. FIG. 2 illustrates a cross-sectional view of the nozzle 10 and heater 12 of FIG. 1 taken at section X-X. The heater 12 may include a graduating material 14 disposed over at least a portion of the nozzle body 10. A dielectric material 16 may be disposed over at least a portion of the graduating material 14. A resistive layer 18 may also be applied over the dielectric material 16 and a thermal barrier dielectric material 20 may be included over the resistive layer 18. Optionally, a sealant coating 22 may be applied over the second dielectric material. The various layers 14, 16, 18 and/or 20 may be substantially coextensive with one or more adjacent layers.

Figure 3:
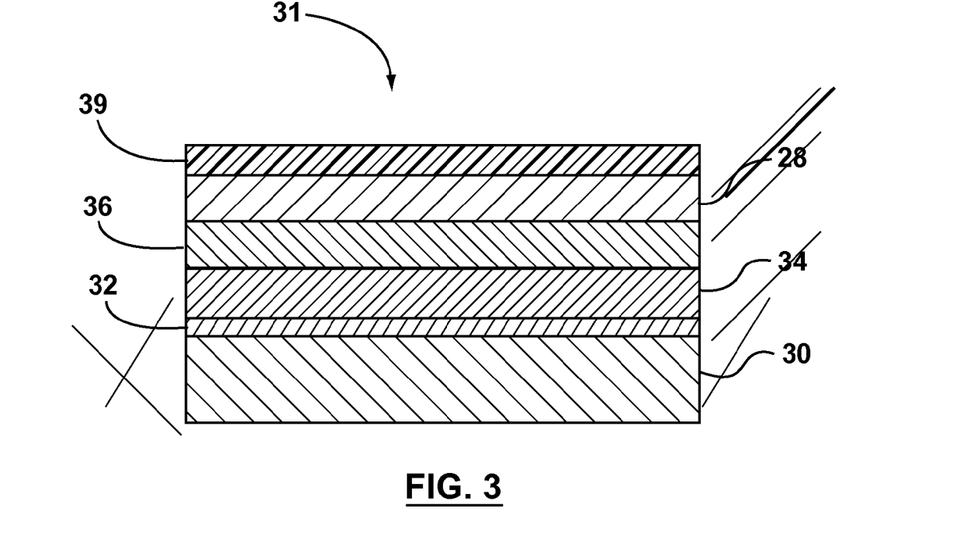
FIG. 3 is an exemplary cross-section of a spray deposited heater element.

FIG. 3 illustrates another exemplary cross-sectional view of a heater 31 disposed onto a substrate 30. The heater 31 may include a semi-conductive graduating material 32, a resistive material 34 disposed over the graduating material 32, a conductive material 36 disposed in a mixture with the resistive material 34, and a thermal barrier dielectric material 28 disposed over the conductive layer 36. Optionally, a sealant coating 39 may be applied over the thermal barrier dielectric material 28. Sealant coating 39 may be formulated to prevent moisture ingress into a substrate but may also include a physically generated impenetrable surface. For example, sealant coating 39 may include a laser or plasma melted glass sealant material.

Figure 4:
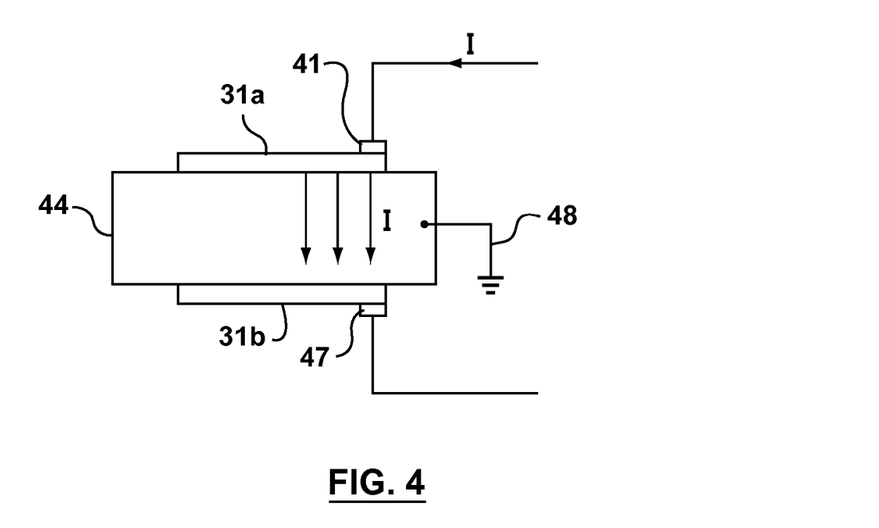
FIG. 4 is an exemplary schematic drawing of a through heating substrate.

It should therefore be appreciated that in this embodiment, the substrate 30 may become part of the circuit and that current may be conducted through the substrate. FIG. 4 illustrates a schematic diagram of such a configuration, wherein current I may flow from a power source (not illustrated) through a contact 41 in electrical communication with at least one conductive layer (heater) 31a, through the substrate 44 to another heater 31b and contact 47 of similar configuration and back to the power source (not illustrated). The substrate may also be grounded 48.

Figure 5:
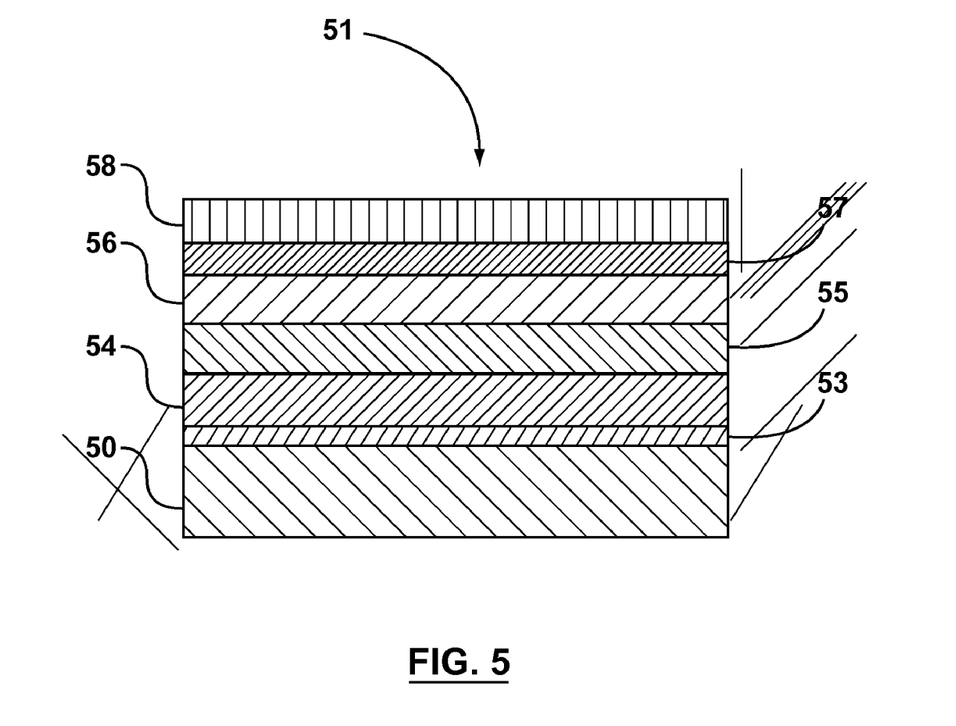
FIG. 5 is an exemplary cross-section of a spray deposited heater element.

A further embodiment is illustrated in FIG. 5, which includes a heater 51 disposed on a substrate 50. The heater 51 may include a graduating layer 53, a dielectric layer 54, a resistive layer 55, a second dielectric layer 56, a relatively high electromagnetic permeability material 57 and a thermal barrier dielectric material 58. Accordingly, it should be appreciated that such a heater 51 may provide both inductive and resistive heating.

Therefore, in a broad respect a heater consistent with the present disclosure may include a graduating material, a resistive material and a thermal barrier dielectric coating. In addition, the heater may include a second dielectric layer between the graduating material and the resistive material. Furthermore, the heater may optionally include a conductive material and/or a material exhibiting a relatively high permeability. The heater may be formed on a substrate, including a plasticator nozzle, sprue bushings, molds, hot runner manifolds, hot runner nozzles, barrels, extruder dies, etc.

The graduating material may accommodate the variation in the coefficient of thermal expansion between the substrate material and the heater materials. Accordingly, the graduating material may prevent cracking or peeling of the heater from the substrate surface as the materials thermally cycle. The graduating material may include alloys based on nickel, cobalt, chromium, iron and combinations thereof, such that the base material is present at least approximately 35% by weight. Such alloys may include, for example, NiCr, or NiAl, CoNi or Ni. The graduating material may also include various elements, such as refractory metals, rare earth elements, other transition metals, non-metals, poor metals or metalloids. In addition, the graduating material may also include ceramic domains. Such domains may also include oxides, nitrides, carbides, yttrium aluminum garnet, aluminum spinel, mullite, etc. The graduating material may be present at a thickness in the range of about 0.01 to 30 μm, including all values and increments therein.

The resistive material may convert electrical energy to thermal energy, such as when current is provided to the resistive material. The resistive material may include at least two resistive compositions. The first resistive composition may have a first specific resistivity $\rho_1$ and the additional (second, third or more) resistive composition may have a second (or more) specific resistivity $\rho_2$ wherein the first and second resistivities $\rho_1$, $\rho_2$ may not be equal. Accordingly, by varying the weigh percentage of at least two resistive compositions in the resistive material in given areas of a resistive layer, the resistivity of the resistive material may be altered in that given area. It should be appreciated that in some given areas, the first resistive composition may be present in the range of greater than 0 to less than 100% by weight, including all values and increments therein and the second resistive composition may be present in the range of greater than 0 to less than 100% by weight, including all values and increments therein. Moreover, should a third or more resistive composition be utilized, the third or more resistive composition may be in the range of between 0-less than 100% by weight, including all values and increments therein. Accordingly, in other given areas, the first and second (or third or more) resistive compositions may be present at different weight percents. For example, in another given area the resistive composition may be present at least 0.1% by weight to 99.9% by weight, including all values and increments therein, and the second resistive composition may be present at least 0.1% to 99.9% by weight, including all values and increments therein. Furthermore, while providing only two resistive compositions are described above, more than two resistive compositions may be provided and the additional resistive compositions may also be present in given locations at a weight percent of 0-100%, depending on the heating requirements of the substrate.

Figure 6A:
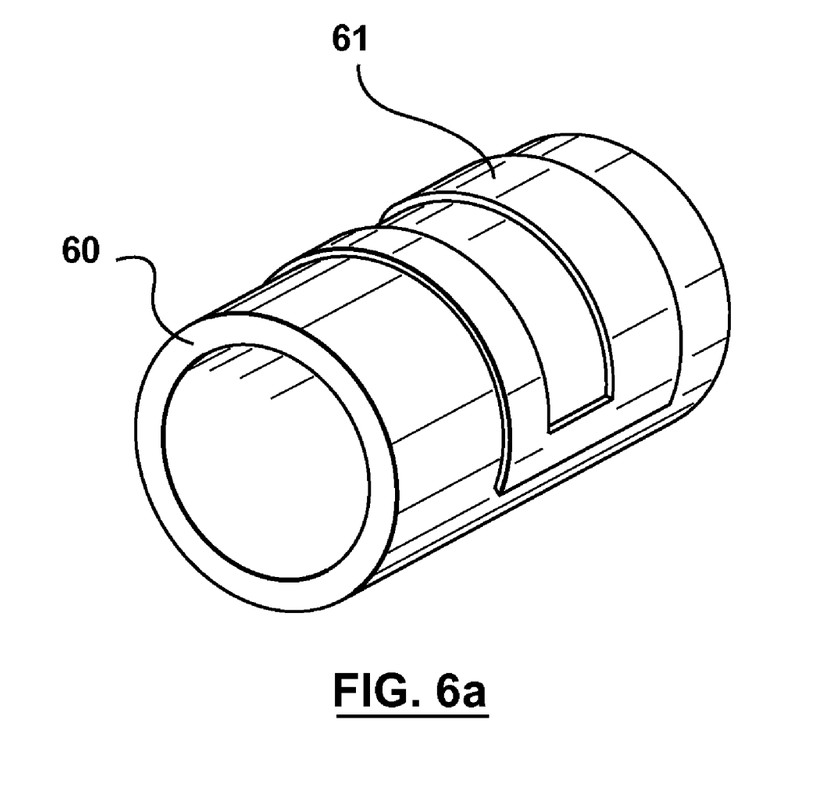
FIGS. 6a and 6b are exemplary embodiments of pattern heaters provided on a nozzle (a) and a manifold (b)
Figure 6B:
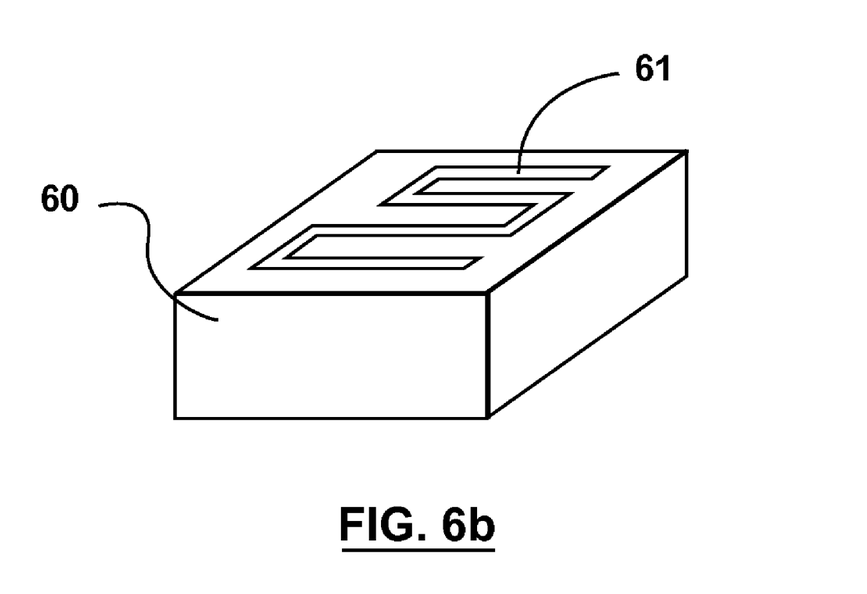

In such a manner, the resistivity of the resistive material may be changed without necessarily changing the thickness or geometry of the resistive layer, but rather by changing the material composition of the resistive layer. However, this is not to the exclusion of changing the thickness or geometry of the resistive layer, which may be altered as well. Furthermore, the resistive layer and/or the heater may be patterned; i.e., as illustrated in FIGS. 6a and 6b, the resistive layer and/or heater 61 may be provided over selected areas of a substrate 60. It should therefore also be appreciated that such variance of the resistivity and/or patterning may provide heat in specific areas or accommodate for different heat sinks, and intricate volume reductions, etc.

The resistive material may include a number of materials which have an electrical resistivity in the range of about $1 \times 10^{-9}$ to $1 \times 10^{-6}$ ohm-m at 20° C., including all values and increments therein. The resistive material may also include materials such as silver, gold, tungsten, copper, platinum, molybdenum, palladium, iridium, chromium nitride, titanium, titanium nitride, titanium carbide, titanium carbonitride, titanium aluminum nitride, etc. However, the resistive materials may also include materials having a resistivity in the range of $1 \times 10^{-6}$ to $1 \times 10^{14}$ ohm-m at 20° C., including all values and increments therein. Such other materials may include alumina, titania, etc.

In a further embodiment, the resistive material may be supplied from similar base materials via thermal spray treatment using different gasses mixtures and therefore forming slightly different alloys or oxides having different specific resistance. Such gasses may include nitrogen, oxygen, carbon dioxide, helium, argon, neon, xenon, etc. Accordingly, a first resistive composition may be formed by depositing a resistive material using a first gas and a second resistive composition may be formed by depositing the resistive material using a second gas. The resistive material may be present at a thickness of about 1 to 2000 µm, including all values and increments therein.

The thermal barrier dielectric composition may include materials that exhibit high temperature stability and relatively high thermal conductivity. For example, the thermal barrier dielectric layer may exhibit a thermal conductivity in the range of 1 to 220 $Wm^{-1}K^{-1}$, including all values and increments therein. A few exemplary thermal barrier dielectric materials may include ceramics such as transition metal/metalloid oxides, nitrides or carbides such as aluminum oxide, magnesium oxide, aluminum nitride, silicon carbide or silicon oxide. The second dielectric layer may be composed of ceramics as well such as transition metal or metalloid oxides, nitrides or carbides. The thermal barrier dielectric compositions and the dielectric layers may be composed of the same or different materials in any given embodiment. The thermal barrier dielectric coating may be present at a thickness in the range of about 10 to 2500 µm, including all values and increments therein. An additional dielectric coating may be present at a thickness in the range of about 1 to 2000 µm, including all values and increments therein.

An exemplary conductive material may include materials that may be electrically or thermally conductive. Such materials may or may not be magnetic materials. For example, the materials may exhibit an electrical resistivity in the range of about $1 \times 10^{-9}$ to $1 \times 10^{-6}$ ohm-m at 20° C., including all values and increments therein. In addition, the materials may exhibit a thermal conductivity of about 10 $Wm^{-1}K^{-1}$ to 450 $Wm^{-1}K^{-1}$, including all values and increments therein. Exemplary materials may include copper, aluminum, iron, nickel, tungsten, gold, silver and alloys thereof. The conductive material may be present at a thickness in the range of about 0.1 to 150 µm, including all values and increments therein.

A material having a relatively high permeability may also be provided and may exhibit a permeability of about 100 µN/A² to 25,000 µN/A², including all values and increments therein. Exemplary materials exhibiting a relatively high permeability may include nickel, soft ferrite, cobalt, iron, magnetite, yttrium iron garnet, chromium oxide, etc. The relatively high permeability material may be present at a thickness in the range of about 0.1 to 3000 µm, including all values and increments therein.

The resistive material may be connected to a power supply providing current via electrical connectors or contacts. The contacts may be sprayed, printed or otherwise connected to the resistive material such that the resistive material is in electrical communication with the contacts. The contacts may then be electrically connected to a power supply or a controller, which provides current to the resistive material.

Furthermore, a thermocouple or other temperature detecting device may be positioned in contact with or proximate to the substrate. The thermocouple may also be in electrical communication to the controller. The controller may then utilize the feedback or signals from the thermocouple to determine when to supply current or the amount of current which may be necessary to drive the heater. The controller may be one suited to control multiple heaters in multiple locations. For example, in an injection molding machine, the controller may be capable of controlling the heater described herein as well as other types of heaters, i.e., calrods, heater bands, etc., in addition to controlling multiple heating zones, including hot runner manifolds, plasticator nozzles, hot runner nozzles, sprue bushings, etc.

The individual heater layers may be applied via a number of coating technologies. For example, many of the layers may be applied by thermal spray processes such as arc spraying, flame spraying or plasma spraying, such techniques may therefore include high velocity oxygen-fuel, DC-arc plasma spray, wire-arc spray, etc. Electron beam application for spraying and depositing may provide particular high resolution when used for depositing traces of specific material. However, it should be appreciated that various other technologies may be used as well. For example, if a glass sealant coating is applied, glass may be laser sintered onto the surface of the heater. Additionally, a laser may be used to ablate the conductive layer and create hole in the conductive layer forcing the current around holes and affecting current distribution over surface of the heater by changes in hole pattern in conductive layer of the heater. Sol-gels may also be used in applying some of the materials.

Figure 7:
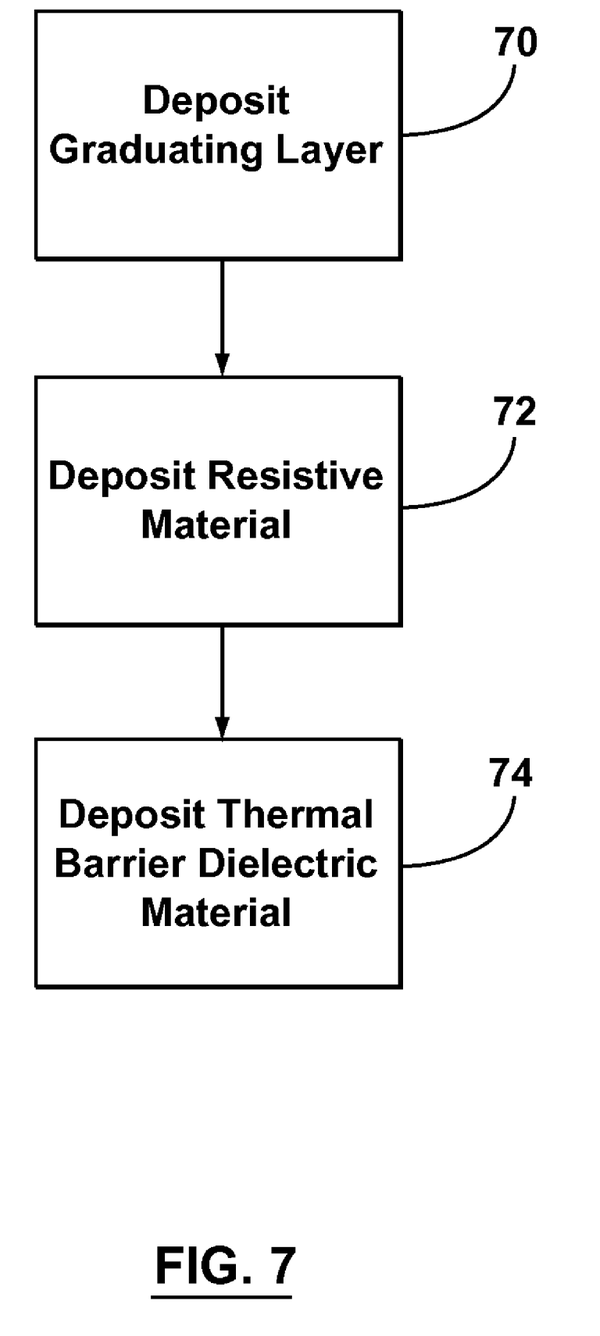
FIG. 7 is an exemplary method of applying a resistive heater.

The heater may be applied, as illustrated in FIG. 7, by depositing the graduating layer onto at least a portion of the substrate 70. Then the resistive material may be deposited over at least a portion of said substrate 72, such that the resistive material is deposited over at least a portion of the graduating layer deposited in step 70. Then a thermal barrier dielectric material may be deposited over at least a portion of the substrate on the resistive material 74. An additional dielectric material may be deposited between the graduating layer and the resistive material. Furthermore, a conductive layer may be deposited between the resistive material and the thermal barrier dielectric material or a relatively high permeability material may be deposited between a dielectric material and a thermal barrier coating.

In an exemplary embodiment, a substrate may be provided after appropriate milling and shaping processes. The surface of the substrate may then be prepped or cleaned using laser or thermal spray systems. Then the substrate may be positioned in a spray cell, where a servo controlled robot, for example, may apply the resistive material and/or the other materials to the substrate. The robot, or other application device, may therefore be capable of applying the resistive material, such that the material composition may be altered in a given during the application process.

With respect to the resistive material, the material may be deposited using suitable thermal spray techniques. The resistive material may be applied utilizing either at least two spray guns or using multiple feed sources for the resistive material or gas, in single or multiple guns, which may be tightly controlled in terms of composition feed. For example, one spray device may be controlled to provide a first resistive material and a second spray device may be controlled to provide a second resistive material. The spray device may phase in and out the resistive materials to supply a desired variation in composition across the resistive material. Furthermore, the spray device may be controlled such that the resistive material may be applied in desired geometry on the substrate.

Figure 8:
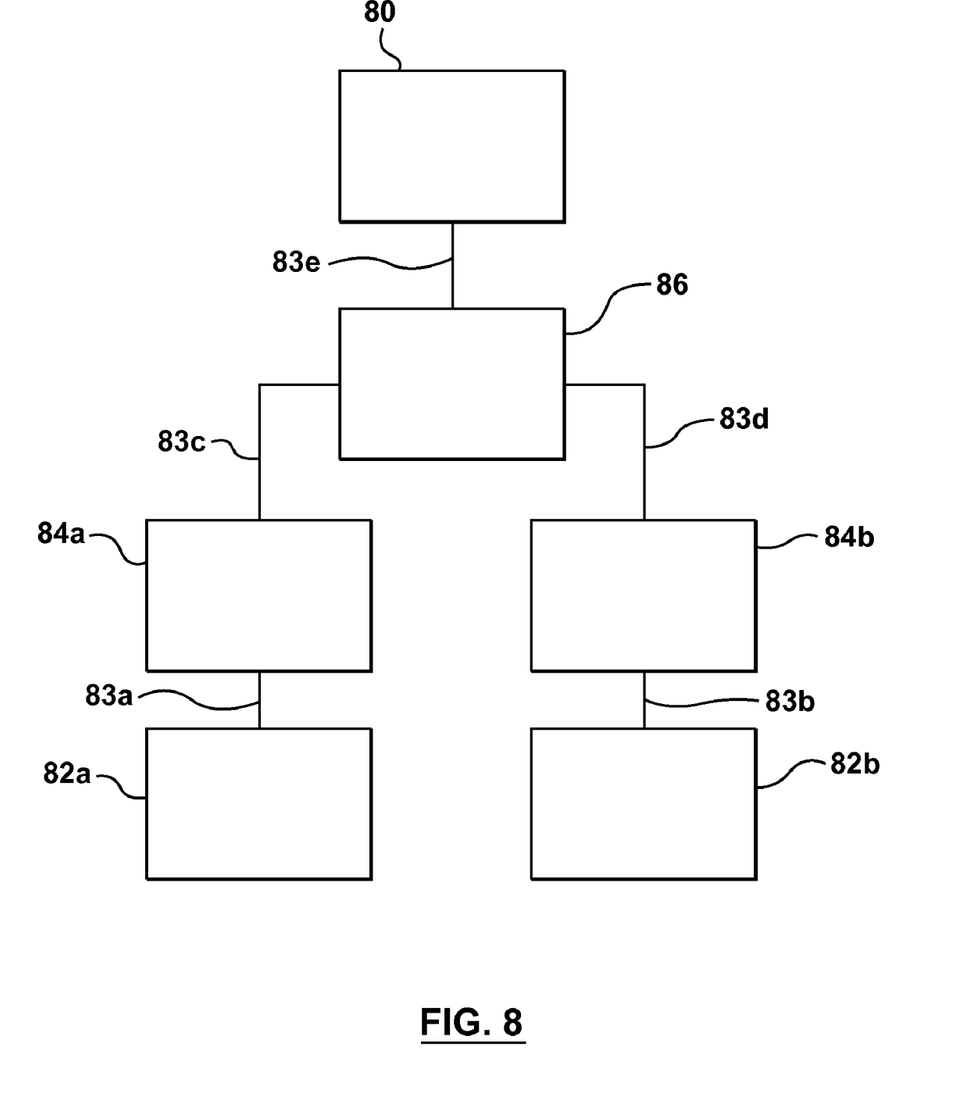
FIG. 8 is an exemplary apparatus for depositing a heater element on a substrate.

A schematic of an exemplary spray device is illustrated in FIG. 8, wherein a single spray device and/or nozzle 80 may be provided for spraying a resistive layer. At least two feed sources 82a and b may be provided to supply the resistive compositions through a number of feed lines 83a, b, c, d and e. Feed controllers or pumps 84a and b may be provided to meter the resistive compositions and feed the compositions to a mixing valve 86 or other mixing device. The resistive composition mixture may then be supplied to the spray device or nozzle 80 and applied to a substrate. It should be appreciated that more than two resistive compositions may be provided and fed through the mixing valve.

Figure 9:
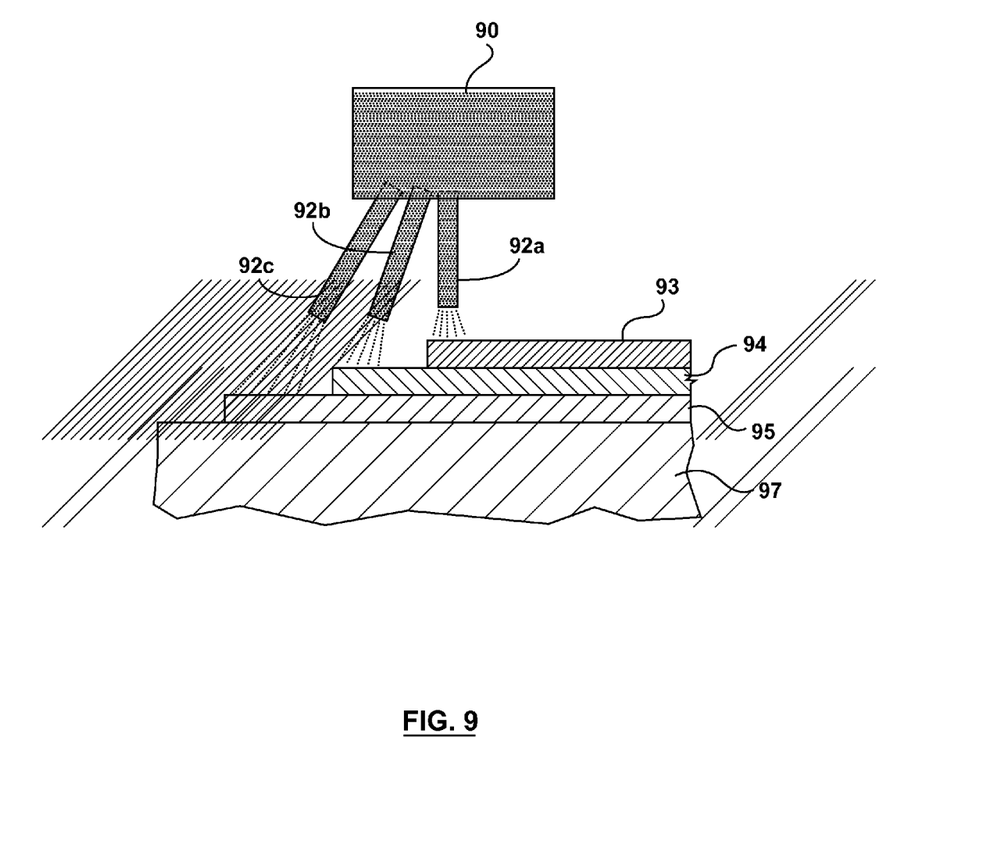
FIG. 9 is another exemplary apparatus for depositing a heater element on a substrate.

A schematic of another exemplary spray device 90 is illustrated in FIG. 9, wherein multiple nozzles 92a, b and c may be utilized for not only the resistive material 93 but also applying the other materials 94 and 95 onto a substrate 97 as well. Although not illustrated, the nozzles 92a, b and c may also be capable of applying multiple layers of a single material or a single layer of multiple materials where the materials are mixed upon deposition onto the substrate. Furthermore, it should be appreciated that the resistive material compositions may be applied by more than one nozzle or combined prior to spraying and applied by a single nozzle. The spray guns may be manually controlled or automated and controlled using software for design and/or prediction of thermal management systems. Furthermore, the substrate may be articulated to facilitate the coating process.

In addition, it should be appreciated that the spray device may be used in combination with a mask positioned on the substrate. The mask may provide for various patterns or may prevent portions of the substrate from being sprayed upon. Furthermore, the mask may be positioned on the aperture of the spray device to provide a defined spray pattern.

The foregoing description is provided to illustrate and explain the present disclosure. However, the description hereinabove should not be considered to limit the scope of the disclosure set forth in the claims appended here to.

What is claimed is:

1. A method of forming a heater comprising:
depositing a graduating material on at least a portion of a substrate;
depositing a resistive material over at least a portion of said substrate, wherein the resistive material includes a mixture of a first resistive composition and a second resistive composition, wherein said first resistive composition has a first resistivity of $\rho_1$ and said second resistive composition has a resistivity of $\rho_2$, wherein $\rho_1 \neq \rho_2$; and
depositing a thermal barrier dielectric material over at least a portion of said substrate; and
mixing said first resistive composition and said second resistive composition prior to depositing said first resistive composition and said second resistive composition over at least a portion of said substrate.

2. The method of claim 1, wherein said first resistive composition and said second resistive composition may be deposited by thermal spraying.

3. The method of claim 1, further comprising preparing a surface of said substrate.

4. The method of claim 1, wherein depositing said resistive material further comprises varying the weight percentage of said first resistive composition and said second resistive composition over at least a portion of said substrate.

5. The method of claim 1, further comprising mixing said first resistive composition and said second resistive composition prior to spraying said first resistive composition and said second resistive composition over at least a portion of said substrate.

6. The method of claim 1, further comprising mixing said first resistive composition and said second resistive composition after spraying said first resistive composition and said second resistive composition onto said substrate.

7. The method of claim 1, wherein said first resistive composition and said second resistive composition include substantially the same base material, and said resistivity of said first resistive composition and said second resistive composition are altered by depositing said first resistive composition with a first gas and said second resistive composition with a second gas.

8. The method of claim 1, wherein said first resistive composition and said second resistive composition may be deposited by electron beam.

9. The method of claim 1, further comprising preparing a surface of said substrate.

10. The method of claim 1, wherein depositing said resistive material further comprises varying the weight percentage of said first resistive composition and said second resistive composition over at least a portion of said substrate.

* * * * *